(12) United States Patent
Chatterjee et al.

(10) Patent No.: US 10,133,623 B2
(45) Date of Patent: Nov. 20, 2018

(54) SYSTEMS AND METHODS FOR DETERMINING AND RECTIFYING EVENTS IN PROCESSES

(71) Applicant: Tata Consultancy Services Limited, Mumbai (IN)

(72) Inventors: Soumya Chatterjee, Kolkata (IN); Sanjib Palchaudhuri, Kolkata (IN); Indranil Mutsuddi, Kolkata (IN); Debabrata Mondal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 178 days.

(21) Appl. No.: 15/418,293

(22) Filed: Jan. 27, 2017

(65) Prior Publication Data
US 2017/0293522 A1    Oct. 12, 2017

(30) Foreign Application Priority Data

Mar. 30, 2016    (IN) .............................. 201621011173

(51) Int. Cl.
*G06F 11/07* (2006.01)
*G06Q 10/06* (2012.01)

(52) U.S. Cl.
CPC ........ *G06F 11/0793* (2013.01); *G06F 11/079* (2013.01); *G06F 11/0721* (2013.01); *G06F 11/0751* (2013.01); *G06Q 10/067* (2013.01)

(58) Field of Classification Search
CPC ... G06F 11/076; G06F 11/079; G06F 11/0793
(Continued)

(56) References Cited

U.S. PATENT DOCUMENTS

| 5,717,879 A | 2/1998 | Moran et al. |
|---|---|---|
| 7,188,169 B2 | 3/2007 | Buus et al. |
| 7,882,394 B2 * | 2/2011 | Hosek ................ G05B 23/0235 702/184 |

(Continued)

FOREIGN PATENT DOCUMENTS

| CN | 101236490 A | 8/2008 |
|---|---|---|
| CN | 101950390 A | 1/2011 |

OTHER PUBLICATIONS

Adriansyah et al., "Robust Performance Analysis on YAWL Process Models with Advanced Constructs", Journal of Information Technology Theory and Application (JITTA), vol. 12, Issue 3, pp. 5-26, (2011).

*Primary Examiner* — Chae M Ko
(74) *Attorney, Agent, or Firm* — Finnegan, Henderson, Farabow, Garrett & Dunner LLP

(57) ABSTRACT

Systems (100) and methods are provided for obtaining process model which comprises of process maps, wherein process maps comprises of process levels and sub levels, which are configured with key metrics and corresponding time stamp to monitor health of process model. During execution of process model and therein the process levels, configured key metrics are monitored and compared with the pre-defined threshold value. Any increase in the key metrics beyond threshold limit, one or more events are determined, which are analyzed and based on the time stamp of the events, process levels and sub levels are identified and rectified. In one of the embodiment, system (100) enables replay process to replay process model for problem determination purpose. In the replay process, system (100) enables viewing of obtained process model wherein process definition and data with time stamp is in XML format for every step which is recorded in the past.

11 Claims, 12 Drawing Sheets

(58) Field of Classification Search
USPC .................................................. 714/47.2
See application file for complete search history.

(56) References Cited

U.S. PATENT DOCUMENTS

| | | | |
|---|---|---|---|
| 2005/0165822 A1* | 7/2005 | Yeung .................... | G06Q 10/10 |
| 2005/0171833 A1 | 8/2005 | Jost et al. | |
| 2005/0222698 A1* | 10/2005 | Eryurek .................... | G06F 8/34 |
| | | | 700/90 |
| 2006/0074735 A1 | 4/2006 | Shukla et al. | |
| 2006/0095276 A1 | 5/2006 | Axelrod et al. | |
| 2006/0242177 A1* | 10/2006 | Tsyganskiy ............... | G06F 8/72 |
| 2006/0293940 A1* | 12/2006 | Tsyganskiy ............... | G06F 8/72 |
| | | | 705/7.29 |
| 2007/0135957 A1* | 6/2007 | Ogawa .................... | G05B 17/02 |
| | | | 700/109 |
| 2007/0208839 A1* | 9/2007 | Voigt .................. | G06F 12/0253 |
| | | | 709/223 |
| 2008/0178148 A1 | 7/2008 | Enyeart et al. | |
| 2009/0150860 A1* | 6/2009 | Gschwind .............. | G06Q 10/06 |
| | | | 717/104 |
| 2012/0131309 A1* | 5/2012 | Johnson .................... | G06F 9/30 |
| | | | 712/41 |
| 2013/0159047 A1 | 6/2013 | Mayerle et al. | |
| 2014/0025439 A1 | 1/2014 | Kabadzhov et al. | |
| 2015/0058267 A1* | 2/2015 | Kim ........................ | H04L 67/42 |
| | | | 706/14 |
| 2015/0277974 A1* | 10/2015 | Beale .................... | G06F 9/4856 |
| | | | 714/19 |
| 2016/0154692 A1* | 6/2016 | Heinz ................. | G06F 11/0772 |
| | | | 714/2 |
| 2016/0300177 A1* | 10/2016 | Wilmes ............ | G06Q 10/06316 |

\* cited by examiner

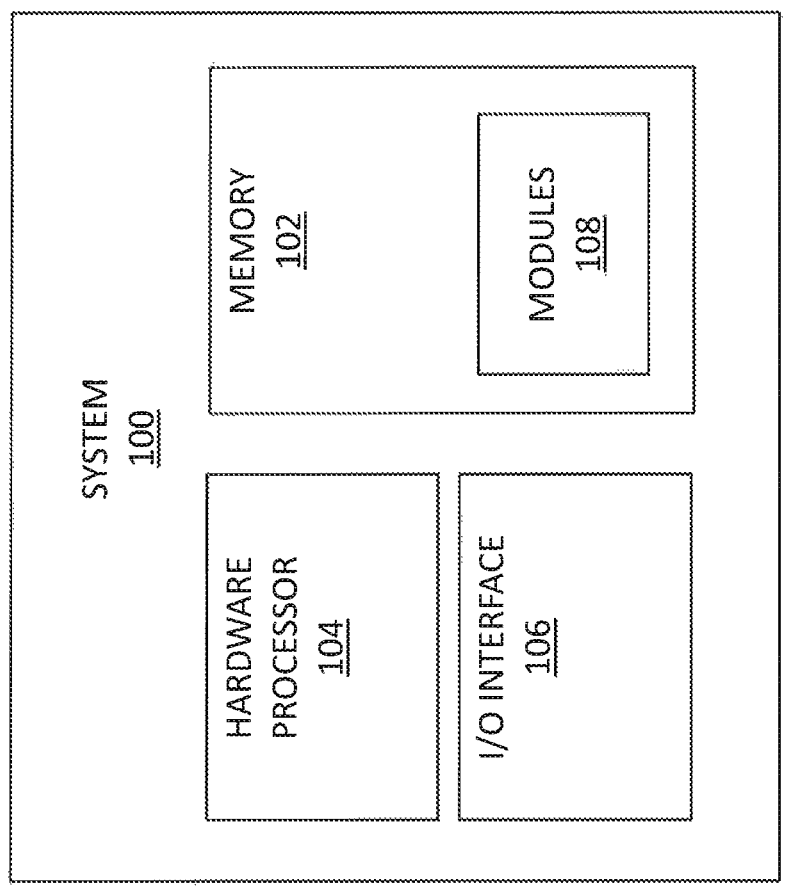

| Column 1 | Column 2 | Column 3 | Column 4 | Column 5 |
|---|---|---|---|---|
| Condition | Condition | Action | Action | Action |
| GECAPSelements | GECAPSelements | GECAPSelements | GECAPSelements | GECAPSelements |
| AppCnt | AppCnt | EmailCode | SMSCode | ColorCode |

| Column 1 | Column 2 | Column 3 | Column 4 | Column 5 |
|---|---|---|---|---|
| 10 | 10 | "DeclineEmail" | "DeclineSMS" | "red" |
|  |  |  |  | "green" |

SYSTEMS AND METHODS FOR DETERMINING AND RECTIFYING EVENTS IN PROCESSES

PRIORITY CLAIM

This U.S. patent application claims priority under 35 U.S.C. § 119 to: India Application No. 201621011173, filed on Mar. 30, 2016. The entire contents of the aforementioned application are incorporated herein by reference.

TECHNICAL FIELD

This disclosure generally relates for process execution systems, and more particularly to systems and methods for determining and rectifying events in processes.

BACKGROUND

There are infinite events linked to processes running in various organizations which is expected to run error free. However, depending on the criticality of the events at the time of occurrence of any issues/faults in the processes due to error/mismatch, the business impact or technical performance is enormous. If unnoticed early, resolution of the same will take lot of time, leave aside technical complications for fixing it. To add, if the problem lies many levels below the multilayer process model, the impact is severe to the organization and the resolution may take lot of time and money. Thus early detection of the problem in the cycle and correcting the data in real time is utmost important.

The inventors here have recognized several technical problems with such conventional systems, as explained below. There are several technical challenges in the existing systems for identifying one or many problem areas early in the process cycle and other challenge exist in taking least possible time to rectify one or more problems that have occurred during the course of running the process model. Also, many times there are complaint about certain events in the process cycle which severely impacts organization's functions and technical performance, but resolution of these events become very difficult as data might get refreshed or updated with new set of data and old occurrence cannot be replicated. If there are multiple process levels, identifying and rectifying them in real time is a big challenge. Even re-running option of the rectified events may impact the outcome of end result.

Since in the existing case, replication of the problem is not a feasible option, only possible solution is to debug the problem or using database query or investigating the source systems, which are crude and most of the times tedious time taking empirical solutions which are not sustainable for long.

SUMMARY

The following presents a simplified summary of some embodiments of the disclosure in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below. In view of the foregoing, an embodiment herein provides systems and methods for determining and rectifying events in processes.

In one aspect, a method for determining and rectifying events in processes is disclosed. In an embodiment, a process model comprising of one or more process maps having one or multiple process levels pertaining to a process system is available. Each of these process levels may have more than one sub levels. The system identifies one or more key metrics for each process levels of a process model. Based on system configuration, values for each of the key metrics is recorded with time stamp for various process levels and monitored. These key metrics values are compared with the pre-defined threshold in the system. When the key metrics is greater than the pre-defined threshold an event is determined. One or more events is an indication of the problem in one or more process levels and have to be rectified by the system. These events are analyzed for identifying one or more process levels where the problem has to be resolved. The time stamp of the recorded key metrics is used to determine the time at which the event has occurred and process level or sub levels of the problem. These events are then rectified with the correct value and the processes are re-started.

In another aspect, system for determining and rectifying events in processes is disclosed. In an embodiment, the system includes one or more processors and a memory communicatively coupled to the one or more processors. The memory includes various modules which will help in identifying key metrics, recording the value for key metrics, monitoring the key metrics, comparing the key metrics with the pre-defined threshold, identifying the process level or sub level where the event has occurred and rectifying the process or sub level to overcome the event. Based on system configuration, key metrics for each process levels and sub levels are identified and records the values of each of the key metrics. Then the system monitors the key metrics value at a regular interval in the system and compares each of the key metrics with the pre-defined threshold in the system. When the key metrics is greater than the pre-defined threshold an event is determined. One or more events is an indication of the problem in one or more process levels and have to be rectified by the system. One of the module analyzes the events for identifying one or more process levels where the problem has to be resolved. The time stamp of the recorded key metrics is used to determine the time at which the event has occurred and process level or sub levels of the problem. These events are then rectified with the correct value and the processes are re-started.

In yet another embodiment, a non-transitory computer readable medium embodying a program executable in a computing device is disclosed. The program obtains a process model comprising of one or more process maps having one or multiple process levels pertaining to a process system by a processor hardware. Each of these process levels may have more than one sub levels. Subsequently, one or more key metrics for each process levels of a process model are identified. Based on system configuration, values for each of the key metrics is recorded with time stamp for various process levels and monitored. These key metrics values are compared with the pre-defined threshold in the system. When the key metrics is greater than the pre-defined threshold an event is determined. One or more events is an indication of the problem in one or more process levels and have to be rectified by the system. These events are analyzed for identifying one or more process levels where the problem has to be resolved. The time stamp of the recorded key metrics is used to determine the time at which the event has occurred and process level or sub levels of the problem. These events are then rectified with the correct value and the processes are re-started.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a block diagram of system for determining and rectifying events in processes according to some embodiments of the present disclosure;

FIG. 4 depicts the configuration of pre-defined threshold value of the key metrics according to some embodiments of the present disclosure;

FIG. 8 depicts a user interface view illustrating a replay process according to some embodiments of the present disclosure; and FIG. 9 is a user interface view illustrating one or more graphical representations according to some embodiments of the present disclosure.

DETAILED DESCRIPTION OF EMBODIMENTS

Figure 2A:
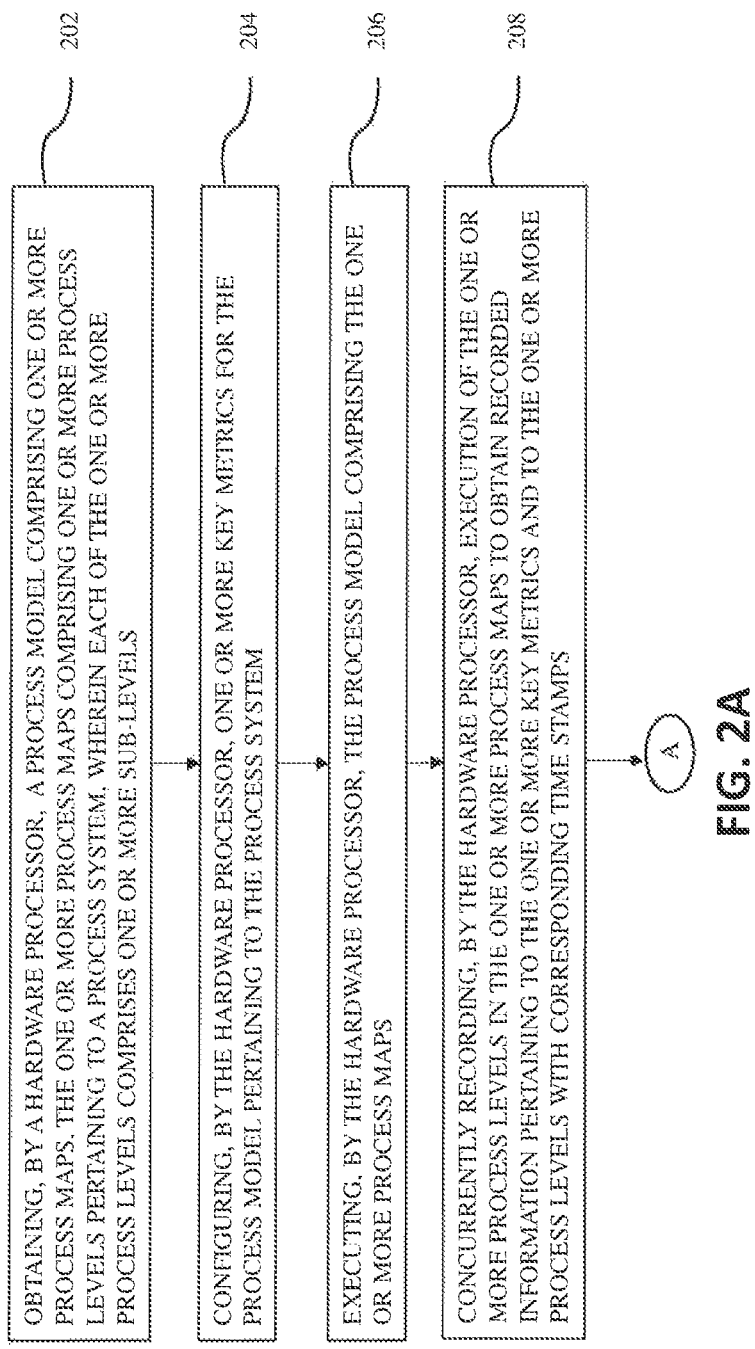
FIG. 2A, FIG. 2B and FIG. 2C is a continuous flow diagram illustrating a processor implemented method for determining and rectifying events in processes using the system of FIG. 1 according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Referring now to the drawings, and more particularly to FIGS. 1 through 9, where similar reference characters denote corresponding features consistently throughout the figures, there are shown preferred embodiments and these embodiments are described in the context of the following exemplary systems and/or methods.

FIG. 1 is a block diagram of a system 100 for determining and rectifying events in one or more processes, according to an embodiment of the present disclosure. The system 100 comprises a memory 102, a hardware processor 104, and an input/output (I/O) interface 106. The memory 102, the hardware processor 104, the input/output (I/O) interface 106, and/or the modules 108 may be coupled by a system bus or a similar mechanism. Although the exemplary block diagram and the associated description refers to a memory and a hardware processor, it may be understood that one or more memory units and one or more hardware processors may be comprised in the system 100. The memory 102 further includes one or more functional modules 108. The memory 102, the hardware processor 104, the input/output (I/O) interface 106, and/or the modules 108 may be coupled by a system bus or a similar mechanism. The system 100 performs one or more transactions (e.g., determining the key metrics values for various process levels and sub levels in a process model, pre-defining threshold value of the key metrics, monitoring and comparing the key metrics, identifying the events in process levels or sub levels and rectifying it).

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, information received from the one or more authorized users (not shown in FIG. 1) through the one or more networks (not shown in FIG. 1).

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104. The system 100 (or the hardware processor 104) executes the modules 108 stored in the memory 102. In an embodiment, the modules 108 comprises of multiple modules.

Figure 2B:
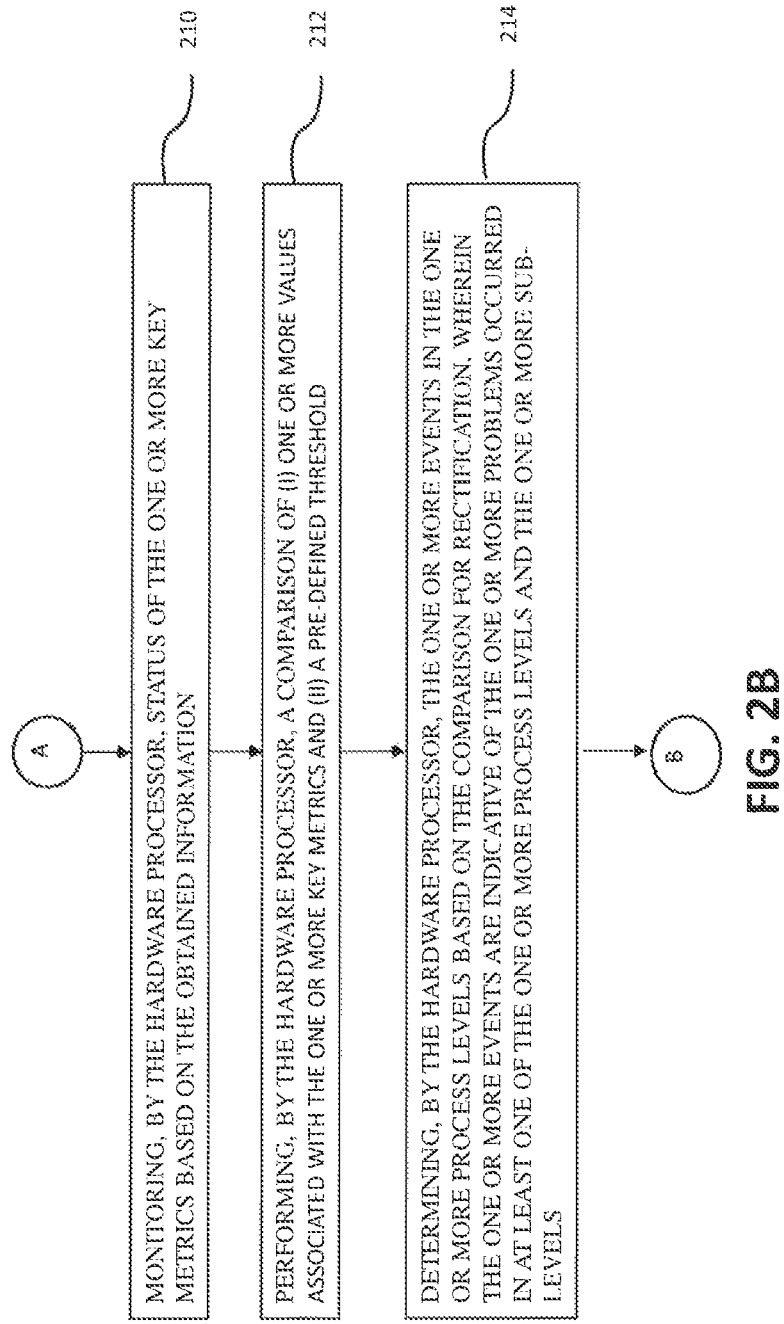
Figure 2C:
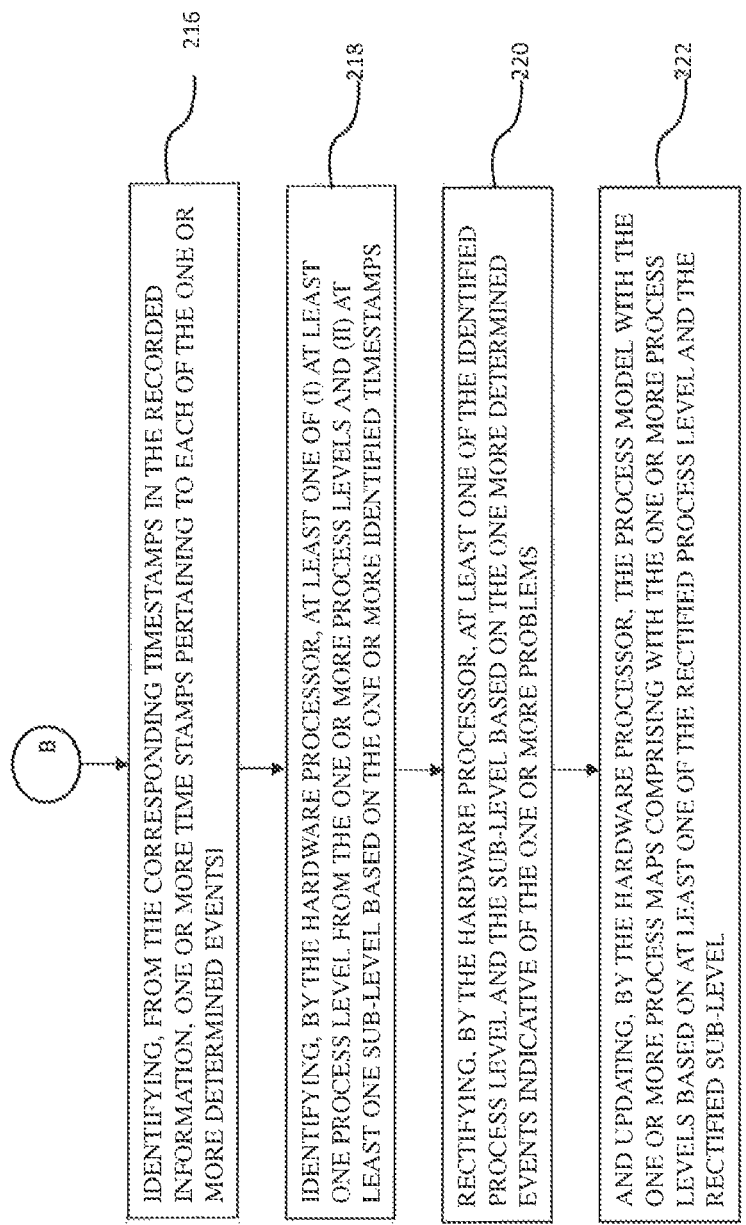

FIG. 2 comprising FIG. 2A, FIG. 2B and FIG. 2C, with reference to FIG. 1 is a continuous flow diagram illustrating a processor implemented method using the system 100 of FIG. 1 according to an embodiment of the present disclosure. The steps of the method of the present disclosure will now be explained with reference to the components of the system 100 and modules 108 as depicted in FIG. 1. The system 100 is configured by the instructions stored in the memory 102. In an embodiment, the method includes obtaining (202), by the hardware processor 104, a process model comprising of one or more process maps, where each process maps comprises of one or more process levels and each of the process levels comprises of one or more sub levels. At step 204, one or more key metrics are identified at the time of defining process model and the key metrics are configured (204) by the hardware processor 104 for the process pertaining to the process system. At step 206, the process model is then executed (206) which comprises of one or more process maps. At step 208, the hardware processor 104 concurrently records execution of the one or more process levels in the one or more process maps to obtain recorded information pertaining to the one or more key metrics and to the one or more process levels with corresponding time stamps. At step 210, the hardware processor 104 monitors status of the one or more key metrics based on the obtained information. At step 212, the hardware processor 104 performs a comparison of (i) one or more values associated with the one or more key metrics and (ii) a pre-defined threshold. At step 214, the hardware processor determines the one or more events in the one or more process levels based on the comparison for rectification.

Based on the comparison of the one or more key metrics (212), the hardware processor 104 determines (214) whether one or more key metrics has increased the pre-defined threshold value. The pre-defined threshold may be configured by one or more users in an example embodiment. In an embodiment the pre-defined threshold may be automatically set by the system 100 based on the type of process model, process maps, levels and sub-levels. In an example embodiment, the pre-defined threshold may be set by the system 100 based on one or more learning patterns (where the system 100 has learnt from previously executed processes, wherein events were determined and rectified). If one or more key metrics has increased the pre-defined threshold value, one or more event is determined by the system 100, in one example embodiment. In an embodiment, the one or more events are indicative of the one or more problems occurred in at least one of the one or more process levels and the one or more sub-levels. At step 216, the hardware processor 204 identifies, from the corresponding timestamps in the recorded information, one or more time stamps pertaining to each of the one or more determined events. At step 218, the hardware processor 104 identifies at least one of (i) at least one process level from the one or more process levels and (ii) at least one sub-level based on the one or more identified timestamps. At step 220, the hardware processor rectifies at least one of the identified process level and the sub-level based on the one more determined events indicative of the one or more problems, and the hardware processor, the process model with the one or more process maps comprising with the one or more process levels based on at least one of the rectified process level and the rectified sub-level in step 222.

Figure 3:
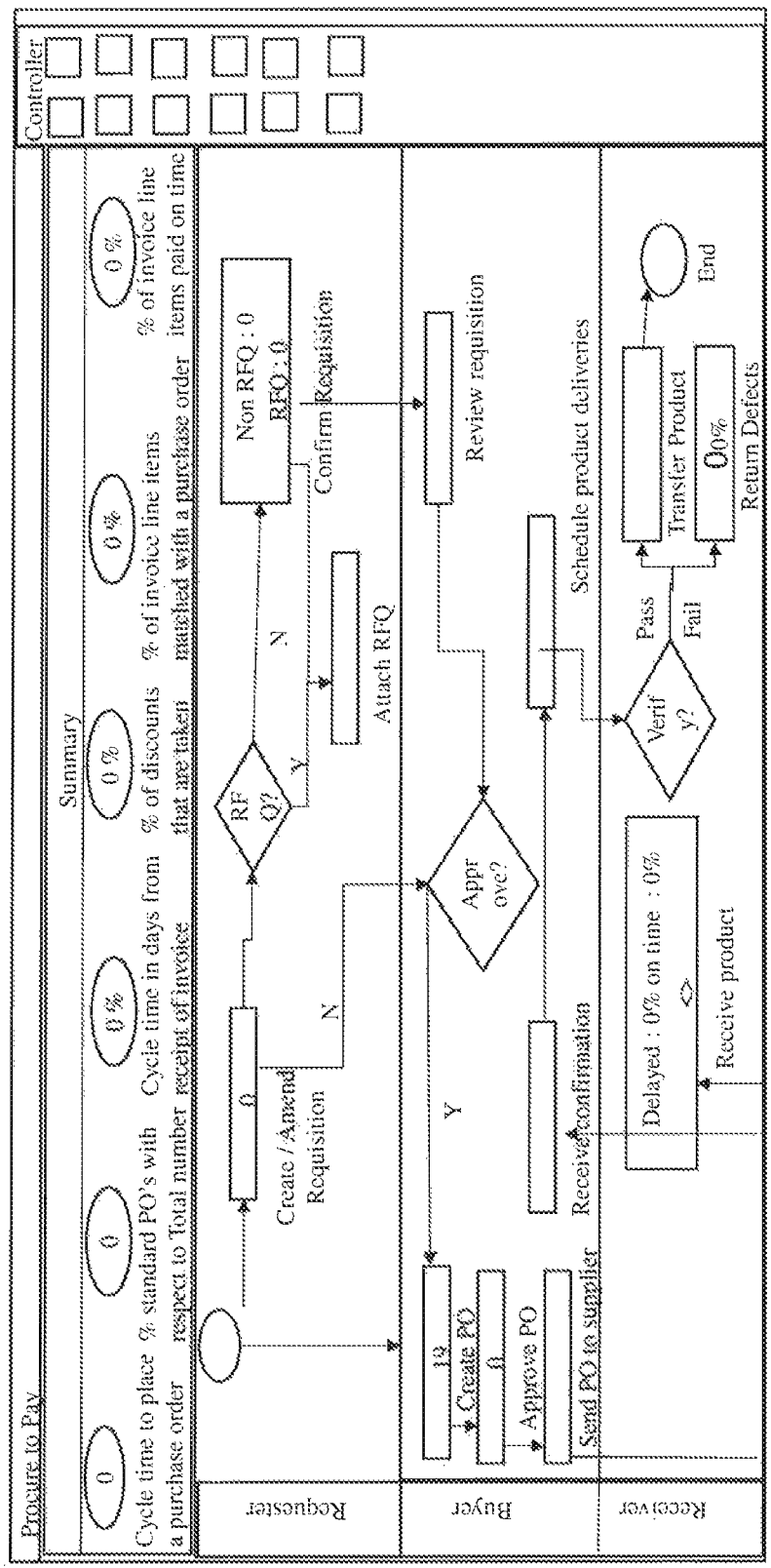
FIG. 3 is an example of an process model that is being executed by the system of FIG. 1 according to some embodiments of the present disclosure.

FIG. 3, with reference to FIGS. 1-2, is an example of a process model that is being executed by the system 100 of FIG. 1 according to an embodiment of the present disclosure. More particularly, FIG. 3 depicts process model pertaining to a procurement system. As can be depicted in FIG. 3, process models are created either on the web in the Process Modeler using any drag-n-drop feature (e.g., a modeling tool). The system 100 also has the capability to import standard process templates e.g., templates in the modeling tool. The system 100 can accept enterprise data sources or external data sources with the process which needs to be monitored. The data received from these systems will be transformed using business rules using in-built rule engine. These business rules can be tested using sample values before they are mapped to the process levels. The data captured pertaining to the one or more process levels with the timestamp and pertaining to the one or more key metrics of the one or more process levels are stored in XML format in memory 102. As seen in FIG. 3, process maps and corresponding one or more process levels are defined, for example, but are not limited to, e.g., Register, Buyer and Receiver. FIG. 3 depicts several key metrics for the process levels and sub levels like cycle time to place a purchase order, % of Standard POs with respect to total number of POs, % of discounts available that are taken and more.

FIG. 4 with reference to FIGS. 1 through 3, depicts the configuration of pre-defined threshold value of the key metrics according to an embodiment of the present disclosure. In an embodiment, the pre-defined threshold value may be 10. As an example, as seen in FIG. 4, if the application count is greater than 10 as compared to recorded corresponding key metrics, then the action taken will be to send decline email and/or send decline SMS and change the color code of key metrics.

Figure 5A:
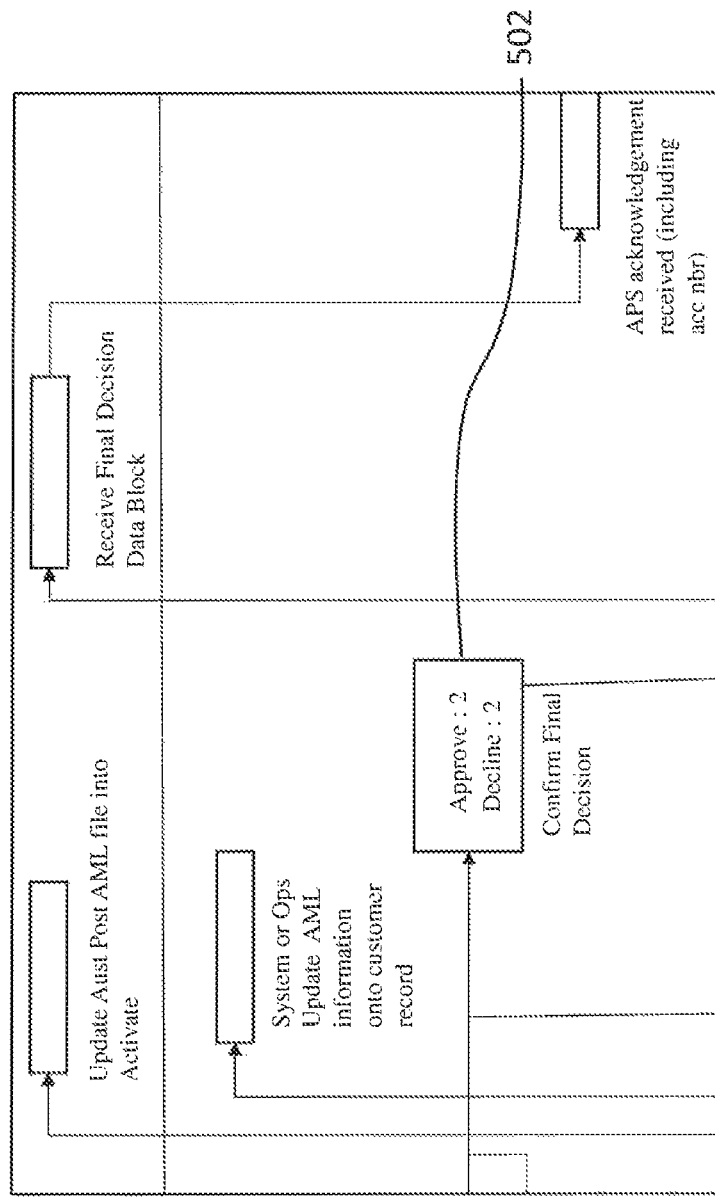
FIG. 5A and FIG. 5B are user interface views depicts recordation and monitoring of key metrics during execution of one or more process models according to some embodiments of the present disclosure.
Figure 5B:
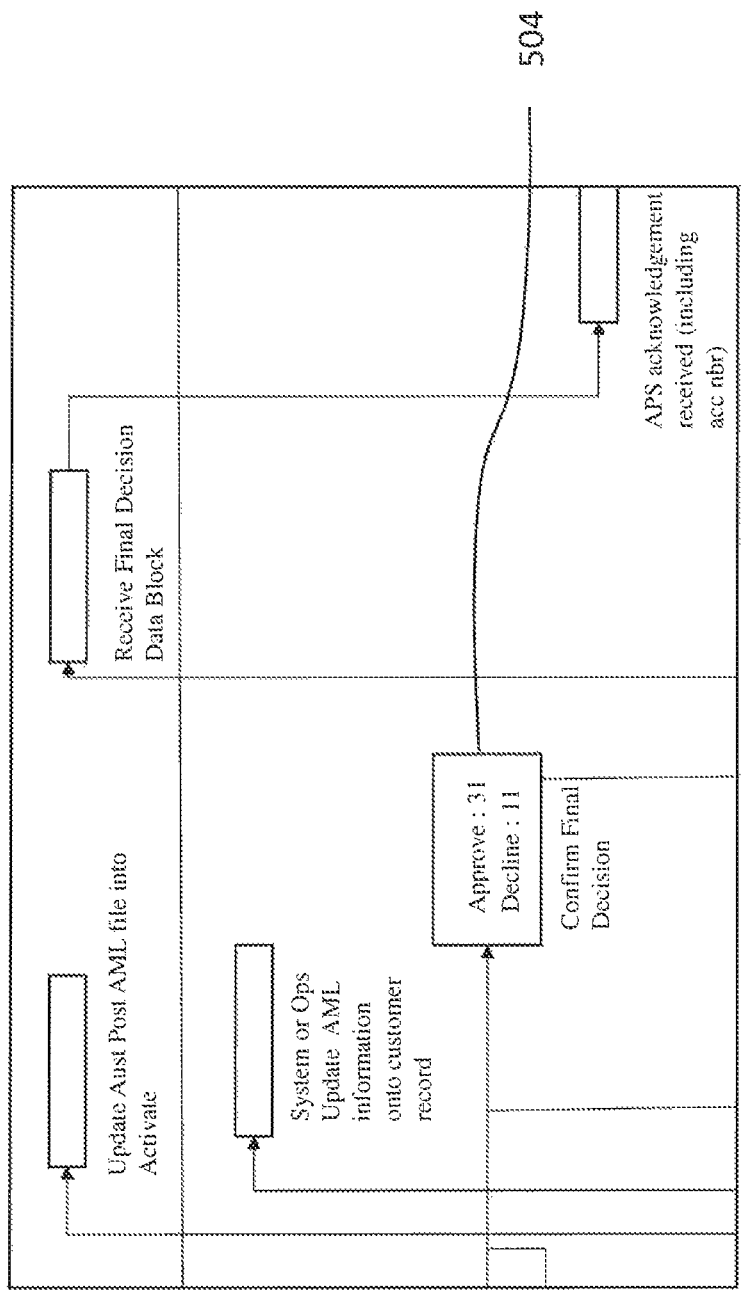

FIG. 5A and FIG. 5B are user interface views depicts recordation and monitoring of key metrics during execution of one or more process models according to an embodiment of the present disclosure. FIG. 5A with reference to FIGS. 1 through 4, depicts how the key metrics recorded in the process level. FIG. 5A depicts the value of key metrics below the pre-defined threshold value (502). FIG. 5B depicts the key metrics has crossed threshold value (504) which was 10 as defined in FIG. 4 and hence the key metrics is indicative of event being determined.

Figure 6:
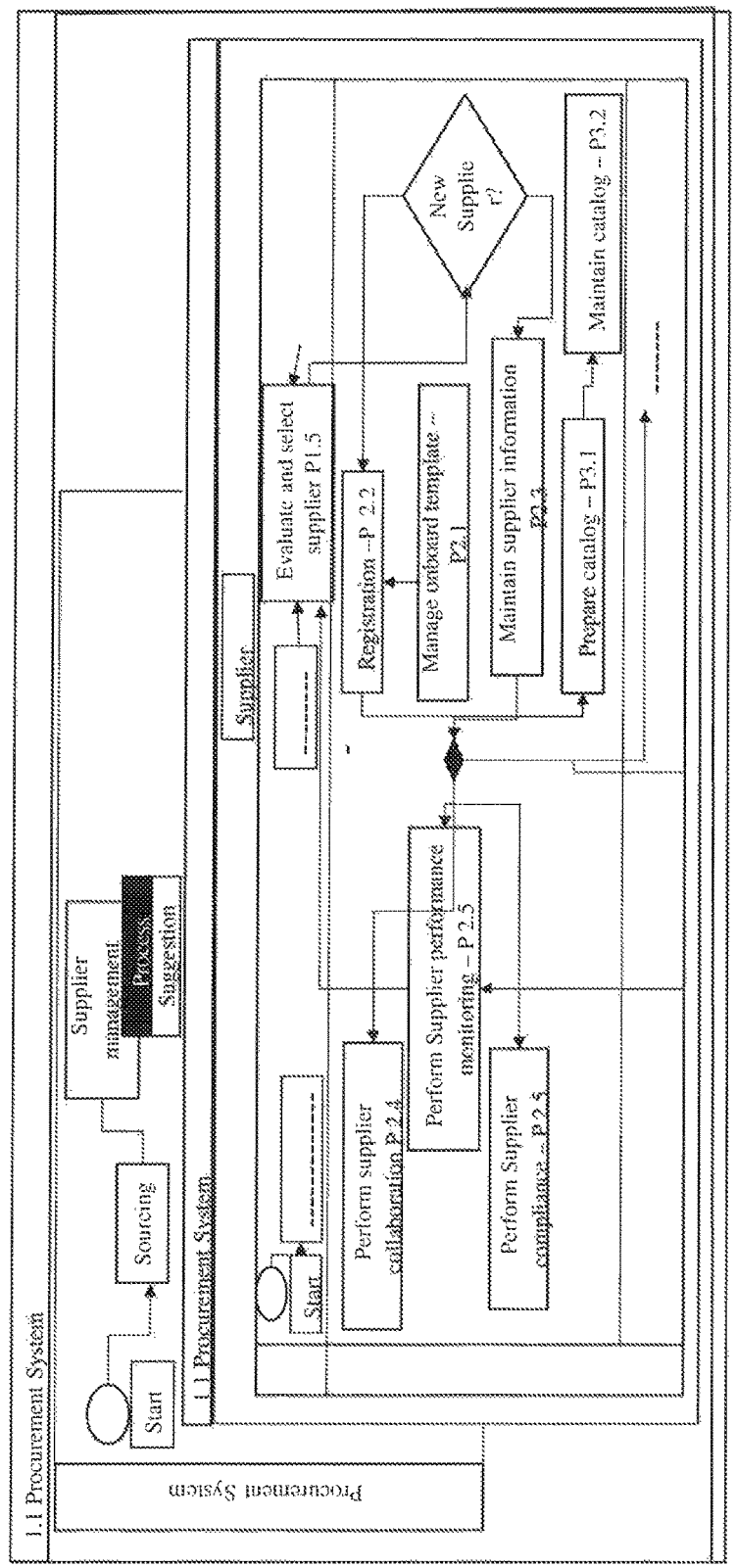
FIG. 6 is a user interface view illustrating determination of one or more event upon corresponding process levels or sub-levels being identified in a process model according to some embodiments of the present disclosure.

FIG. 6, with reference to FIGS. 1 through 5B, is a user interface view illustrating determination of one or more event upon corresponding process levels or sub-levels being identified in a process model according to an embodiment of the present disclosure. More particularly, FIG. 6 depicts one or more process levels that can be drilled down into one or more sub levels of the process e.g., 1.0 procurement system to 1.1 procurement system and so on. The drilling down helps in analyzing and identifying the problem area in the process model that caused the one or more events to occur.

Figure 7:
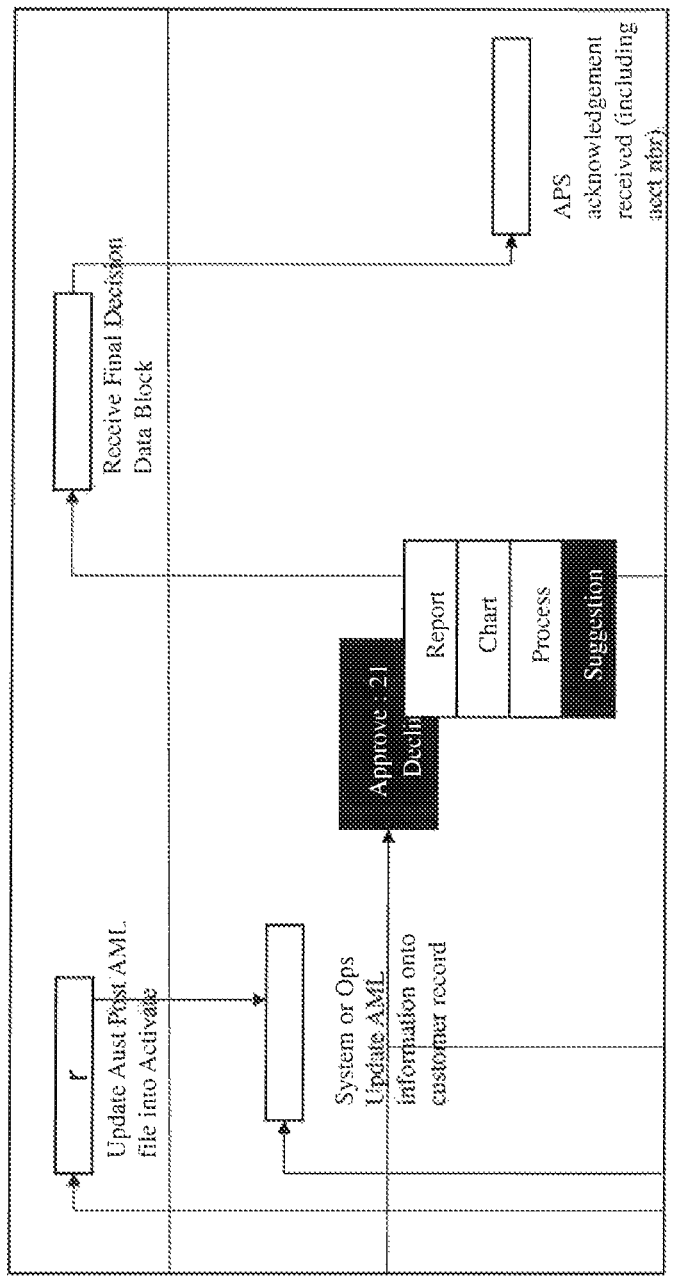
FIG. 7 is a user interface view illustrating a method of rectifying one or more event according to some embodiments of the present disclosure.

FIG. 7, with reference to FIGS. 1 through 6, is a user interface view illustrating a method of rectifying one or more event according to an embodiment of the present disclosure. Rectifying at least one of the identified process level and the sub-level comprises analyzing and resolving the one or more determined events indicative of the one or more problems, wherein rectifying at least one of the identified process level and the sub-level based on the one more determined events indicative of the one or more problems comprises simulating the one or more determined events.

The embodiment of the present disclosure further enables system 100 for self-rectifying one or more event based on Known Error Database (KEDB), where KEDB is a repository in memory 102 that has previously occurred one or more events and corresponding rectifying process. The system 100 keeps updating KEDB and automatically executes the rectifying process if one or more events pertaining to one or more process levels and the sub-levels is matching with KEDB.

Figure 8:
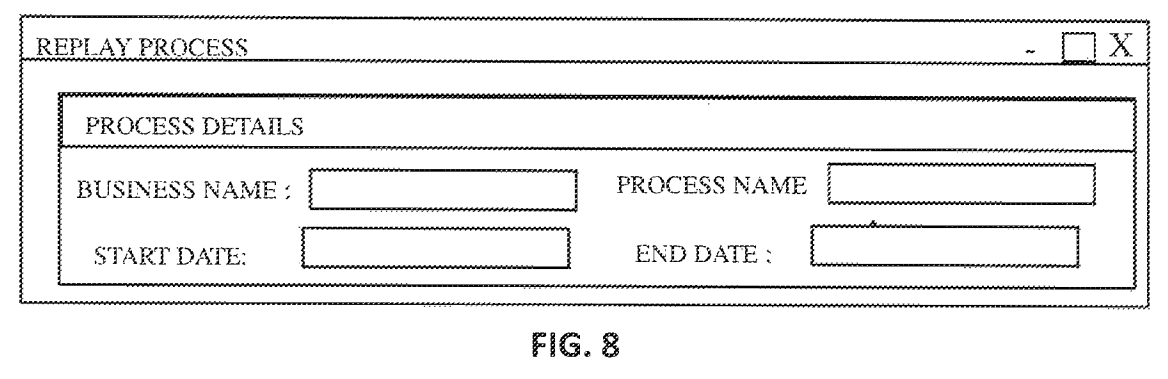

FIG. 8, with reference to FIGS. 1 through 7, depicts a user interface view illustrating a replay process according to an embodiment of the present disclosure. The system 100 enables replay of one or more process models, where the input requested is the form of process map with any date and time. The output is desired snapshot of process map with process levels and sub levels as depicted in FIG. 3 and FIG. 6. The replay process uses a scheduler program to display recorded data/information (e.g., recorded XML data), where the system 100 can drill down from any process level in the overall process map to the nth process level or sub level. Replay process can also drill down into reports, charts, sub processes during replay. This will allow the system 100 to display the performance of the processes in the past. Replay process allows the system 100 to capture all the events and view process for audit or problem determination purposes, and replay them whenever required.

Figure 9:
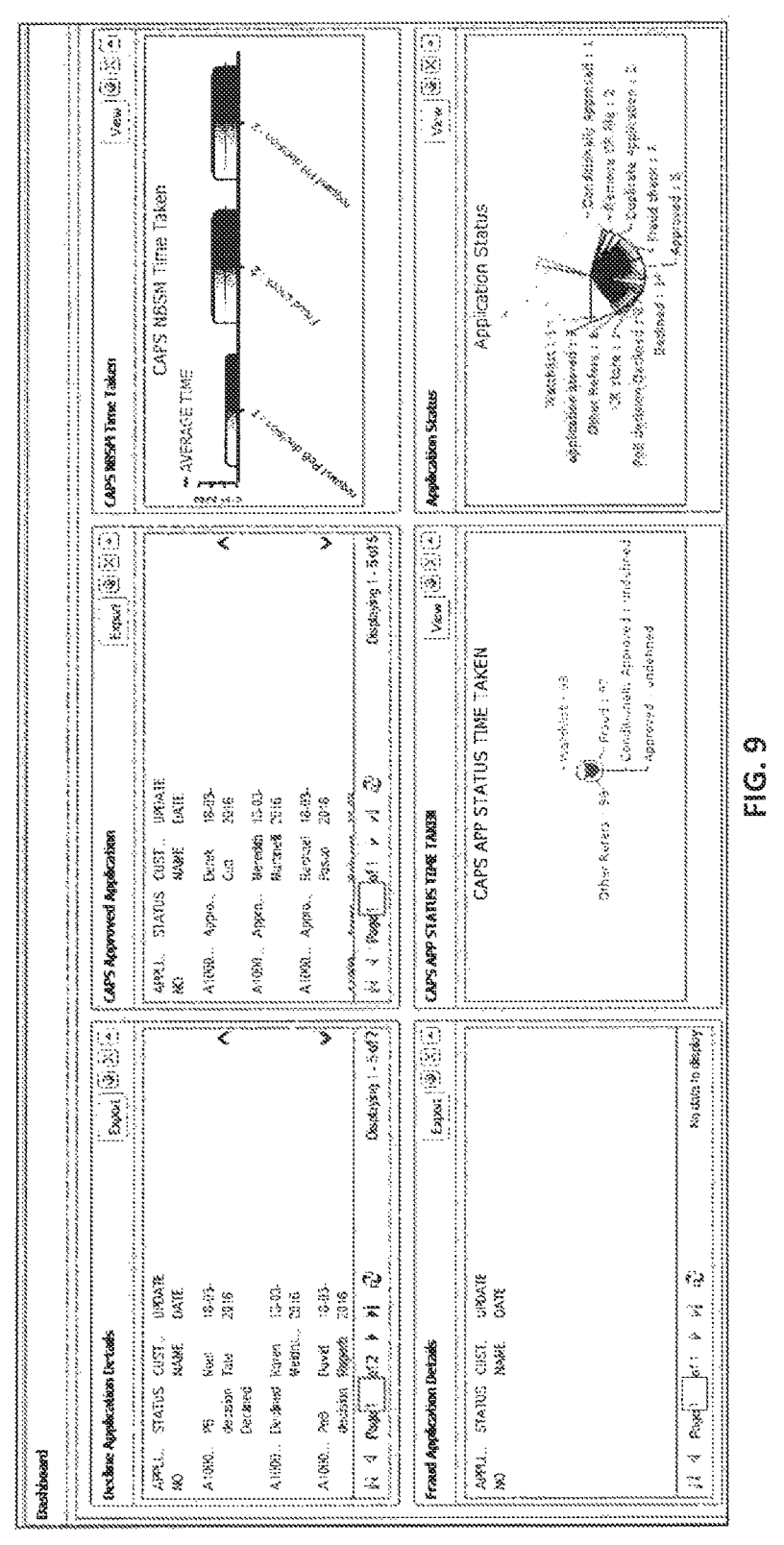

FIG. 9, with reference to FIGS. 1 through 8, is a user interface view illustrating one or more graphical representations according to an embodiment of the present disclosure. The one or more graphical representations depicts various reports, charts and dashboard that are made available through the system 100. For example, the graphical representations may include reports, charts, dashboards pertaining to a decline application details, an application status and so on. In an embodiment, report configuration, execution and viewing are based on access rights and generation of the reports and charts can be scheduled through the system 100.

The system 100 also provides support to mobile devices on to view the analytics in form of reports and charts.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), BLU-RAY, and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

It is intended that the disclosure and examples be considered as exemplary only, with a true scope and spirit of disclosed embodiments being indicated by the following claims.

What is claimed is:

1. A processor implemented method, comprising:
    obtaining, by a hardware processor, a process model comprising one or more process maps, the one or more process maps comprising one or more process levels pertaining to a process system, wherein each of the one or more process levels comprises one or more sub-levels;
    configuring, by the hardware processor, one or more key metrics for the process model pertaining to the process system;
    executing, by the hardware processor, the process model comprising the one or more process maps;
    concurrently recording, by the hardware processor, execution of the one or more process levels in the one or more process maps to obtain recorded information pertaining to the one or more key metrics and to the one or more process levels with corresponding timestamps;
    monitoring, by the hardware processor, status of the one or more key metrics based on the obtained information;
    performing, by the hardware processor, a comparison of (i) one or more values associated with the one or more key metrics and (ii) a pre-defined threshold;
    determining, by the hardware processor, the one or more events in the one or more process levels based on the comparison for rectification, wherein the one or more events are indicative of the one or more problems occurred in at least one of the one or more process levels and the one or more sub-levels;
    identifying, from the corresponding timestamps in the recorded information, one or more time stamps pertaining to each of the one or more determined events;
    identifying, by the hardware processor, at least one of (i) at least one process level from the one or more process levels and (ii) at least one sub-level based on the one or more identified timestamps;
    rectifying, by the hardware processor, at least one of the identified process level and the sub-level based on the one more determined events indicative of the one or more problems; and
    updating, by the hardware processor, the process model with the one or more process maps comprising with the one or more process levels based on at least one of the rectified process level and the rectified sub-level.

2. The processor implemented method of claim 1, wherein rectifying at least one of the identified process level and the sub-level comprises analyzing and resolving the one or more determined events indicative of the one or more problems.

3. The processor implemented method of claim 1, wherein performing a comparison of (i) one or more values associated with the one or more key metrics and (ii) a pre-defined threshold comprises determining whether the one or more values associated with the one or more key metrics are greater than the pre-defined threshold.

4. The processor implemented method of claim 1, wherein rectifying at least one of the identified process level and the sub-level based on the one more determined events indicative of the one or more problems comprises simulating the one or more determined events.

5. The processor implemented method of claim 1, wherein identifying at least one of (i) at least one process level from the one or more process levels and (ii) at least one sub-level comprises playing the recorded information specific to the one or more identified timestamps.

6. A system comprising:
    a memory storing instructions;
    one or more communication interfaces;
    one or more hardware processors coupled to the memory using the one or more communication interfaces, wherein the one or more hardware processors are configured by the instructions to:
    obtain a process model comprising one or more process maps, the one or more process maps comprising one or more process levels pertaining to a process system, wherein each of the one or more process levels comprises one or more sub-levels;
    configure one or more key metrics for the process model pertaining to the process system;
    execute the process model comprising the one or more process maps;
    concurrently record execution of the one or more process levels in the one or more process maps to obtain recorded information pertaining to the one or more key metrics and to the one or more process levels with corresponding timestamps;
    monitor status of the one or more key metrics based on the obtained information;
    perform a comparison of (i) one or more values associated with the one or more key metrics and (ii) a pre-defined threshold;
    determine the one or more events in the one or more process levels based on the comparison for rectification, wherein the one or more events are indicative of the one or more problems occurred in at least one of the one or more process levels and the one or more sub-levels;

identify from the corresponding timestamps in the recorded information, one or more time stamps pertaining to each of the one or more determined events;

identify at least one of (i) at least one process level from the one or more process levels and (ii) at least one sub-level based on the one or more identified timestamps;

rectify at least one of the identified process level and the sub-level based on the one more determined events indicative of the one or more problems; and update the process model with the one or more process maps comprising with the one or more process levels based on at least one of the rectified process level and the rectified sub-level.

7. The system of claim 6, wherein the at least one of the identified process level and the sub-level are rectified by analyzing and resolving the one or more determined events indicative of the one or more problems.

8. The system of claim 6, wherein a comparison of (i) one or more values associated with the one or more key metrics and (ii) a pre-defined threshold is performed to determine whether the one or more values associated with the one or more key metrics are greater than the pre-defined threshold.

9. The system of claim 6, wherein the at least one of the identified process level and the sub-level are rectified by simulating the one or more determined events.

10. The system of claim 6, wherein the at least one of (i) at least one process level from the one or more process levels and (ii) at least one sub-level are identified by playing the recorded information specific to the one or more identified timestamps.

11. A non-transitory computer readable medium embodying a program executable in a computing device, the program comprising:

a program code for obtaining, by a hardware processor, a process model comprising one or more process maps, the one or more process maps comprising one or more process levels pertaining to a process system, wherein each of the one or more process levels comprises one or more sub-levels;

configuring, by the hardware processor, one or more key metrics for the process model pertaining to the process system;

executing, by the hardware processor, the process model comprising the one or more process maps;

concurrently recording, by the hardware processor, execution of the one or more process levels in the one or more process maps to obtain recorded information pertaining to the one or more key metrics and to the one or more process levels with corresponding timestamps;

monitoring, by the hardware processor, status of the one or more key metrics based on the obtained information;

performing, by the hardware processor, a comparison of (i) one or more values associated with the one or more key metrics and (ii) a pre-defined threshold;

determining, by the hardware processor, the one or more events in the one or more process levels based on the comparison for rectification, wherein the one or more events are indicative of the one or more problems occurred in at least one of the one or more process levels and the one or more sub-levels;

identifying, from the corresponding timestamps in the recorded information, one or more time stamps pertaining to each of the one or more determined events;

identifying, by the hardware processor, at least one of (i) at least one process level from the one or more process levels and (ii) at least one sub-level based on the one or more identified timestamps;

rectifying, by the hardware processor, at least one of the identified process level and the sub-level based on the one more determined events indicative of the one or more problems; and updating, by the hardware processor, the process model with the one or more process maps comprising with the one or more process levels based on at least one of the rectified process level and the rectified sub-level.

* * * * *